US011873661B2

(12) United States Patent
Bliding et al.

(10) Patent No.: US 11,873,661 B2
(45) Date of Patent: Jan. 16, 2024

(54) KEY STORAGE DEVICE

(71) Applicant: ASSA ABLOY GLOBAL SOLUTIONS AB, Stockholm (SE)

(72) Inventors: Olle Bliding, Halmstad (SE); Eric Wiebols, Halmstad (SE)

(73) Assignee: ASSA ABLOY GLOBAL SOLUTIONS AB, Stockholm (SE)

( * ) Notice: Subject to any disclaimer, the term of this patent is extended or adjusted under 35 U.S.C. 154(b) by 616 days.

(21) Appl. No.: 16/970,279

(22) PCT Filed: Mar. 14, 2019

(86) PCT No.: PCT/EP2019/056462
§ 371 (c)(1),
(2) Date: Aug. 14, 2020

(87) PCT Pub. No.: WO2019/175335
PCT Pub. Date: Sep. 19, 2019

(65) Prior Publication Data

US 2021/0140199 A1 May 13, 2021

(30) Foreign Application Priority Data

Mar. 15, 2018 (EP) .................................... 18161998

(51) Int. Cl.
*E05B 47/00* (2006.01)
*E05B 19/00* (2006.01)
(Continued)

(52) U.S. Cl.
CPC ........ *E05B 47/0012* (2013.01); *E05B 47/026* (2013.01); *E05B 17/10* (2013.01);
(Continued)

(58) Field of Classification Search
CPC .... E05B 19/0005; E05B 63/12; E05B 63/121; E05B 35/086; E05B 41/00;
(Continued)

(56) References Cited

U.S. PATENT DOCUMENTS 4,649,723 A * 3/1987 Appelbaum ........ E05B 19/0005 70/63
4,808,993 A * 2/1989 Clark ........................ G07C 9/33 340/5.73
(Continued)

FOREIGN PATENT DOCUMENTS

CN 102535973 7/2012
CN 205314702 6/2016
(Continued)

OTHER PUBLICATIONS

Official Action with English Translation for China Patent Application No. 201980019453.X, dated Dec. 10, 2021, 17 pages.
(Continued)

*Primary Examiner* — Alyson M Merlino
(74) *Attorney, Agent, or Firm* — Schwegman Lundberg & Woessner, P.A.

(57) ABSTRACT

A key storage device (1) has a tubular housing (8) having an open proximal end (14) and a distal end (15), and a sliding carriage (2) which is insertable into the proximal end (14) of the housing (8). The sliding carriage (2) has a compartment (4) for a key to be stored, and is displaceable between an open position in which a majority of the sliding carriage (2) is outside of the housing (8) and the compartment (4) is accessible for key retrieval, and a closed position in which the majority of the sliding carriage (2) is inside the housing (8) and the compartment (4) is inaccessible. A lock mechanism (12) is arranged within the tubular housing (8). It has
(Continued)

a locked state in which the sliding carriage (2) is kept locked in its closed position and prevented from being displaced to its open position, and an unlocked state in which the sliding carriage (2) may be displaced to its open position. The lock mechanism (12) has a piston (5) and a catch member (7) which are both movable between respective first positions in the locked state of the lock mechanism (12) and respective second positions in the unlocked state of the lock mechanism (12). An electric motor (28) is coupled for causing movement of the piston (5) of the lock mechanism (12). A control unit (35) is adapted to cause the lock mechanism (12) to switch from its unlocked state to its locked state by actuating the motor (28) and thereby causing movement of the piston (5) from its second position to its first position, the movement of the piston (5) in turn causing movement of the catch member (7) from its second position to its first position. The control unit (35) is also adapted, based on an external input (29), to allow the lock mechanism (12) to switch from its locked state to its unlocked state by actuating the motor (28) and thereby causing movement of the piston (5) from its first position to its second position, the movement of the piston (5) in turn allowing movement of the catch member (7) from its first position to its second position.

22 Claims, 7 Drawing Sheets

(51) Int. Cl.

| | |
|---|---|
| ***E05B 41/00*** | (2006.01) |
| ***E05B 17/10*** | (2006.01) |
| ***E05B 47/02*** | (2006.01) |
| *E05B 63/12* | (2006.01) |

(52) U.S. Cl.
CPC ........... *E05B 19/0005* (2013.01); *E05B 41/00* (2013.01); *E05B 63/121* (2013.01); *E05B 2047/0023* (2013.01); *E05B 2047/0058* (2013.01); *E05B 2047/0069* (2013.01); *E05B 2047/0095* (2013.01)

(58) Field of Classification Search
CPC ..... E05B 2047/0016; E05B 2047/0023; E05B 2047/0058; E05B 2047/0069; E05B 2047/0094; E05B 2047/0095; E05B 17/10; E05B 47/0012; G07C 9/00912; G07C 2009/00936
See application file for complete search history.

(56) References Cited

U.S. PATENT DOCUMENTS

| | | | | |
|---|---|---|---|---|
| 5,090,222 | A | 2/1992 | Imran | |
| 2005/0261804 | A1* | 11/2005 | Doty | E05B 37/00 700/275 |
| 2006/0137414 | A1* | 6/2006 | Denison | E05B 47/0012 70/257 |
| 2008/0078223 | A1 | 4/2008 | Amir | |
| 2008/0115544 | A1* | 5/2008 | Yang | E05B 19/0005 70/63 |
| 2008/0236214 | A1* | 10/2008 | Han | E05B 47/0012 70/129 |
| 2020/0018091 | A1* | 1/2020 | Binek | E05B 19/0005 |

FOREIGN PATENT DOCUMENTS

| | | |
|---|---|---|
| CN | 106437327 | 2/2017 |
| DE | 29708523 | 7/1997 |
| EP | 2372068 | 10/2011 |
| WO | WO 01/86099 | 11/2001 |
| WO | WO 2004/018804 | 3/2004 |
| WO | WO 2012/146882 | 11/2012 |

OTHER PUBLICATIONS

Official Action with English Translation for China Patent Application No. 201980019453.X, dated Apr. 2, 2021, 22 pages.

Extended Search Report for European Patent Application No. 18161998.2, dated Sep. 11, 2018, 10 pages.

International Search Report and Written Opinion for International (PCT) Patent Application No. PCT/EP2019/056462, dated Jun. 11, 2019, 16 pages.

* cited by examiner

KEY STORAGE DEVICE

CROSS REFERENCE TO RELATED APPLICATIONS

This application is a national stage application under 35 U.S.C. 371 and claims the benefit of PCT Application No. PCT/EP2019/056462 having an international filing date of Mar. 14, 2019, which designated the United States, which PCT application claimed the benefit of European Patent Application No. 18161998.2 filed Mar. 15, 2018, the disclosure of each of which are incorporated herein by reference.

TECHNICAL FIELD

The present invention relates to a key storage device for safe handling of keys in order to prevent theft of the keys.

BACKGROUND

In cases when a professional, such as a caretaker or a security guard on a round or beat, needs to achieve access to a restricted area, some sort of access control is needed. Such access control may involve physical keys, codes on key pads etc. The former case is highly relevant for caregivers visiting persons receiving care, since most people still have doors that are operated with regular physical keys. For a caregiver visiting several persons every day, the administration around safe handling of keys is cumbersome, and the security is always an issue. Furthermore, an increasingly common need is to be able to give controlled access to private individuals on a temporary basis, for example if an acquaintance has offered to water plants or take care of animals during a trip, or if a customer has rented access to a private domicile for a limited duration.

A solution to this problem is a key storage device, which electronically locks away the physical key until an authorized person electronically identifies himself and is allowed to retrieve the key.

Several attempts at a key storage device have been presented in the prior art. However, while being functional, they have previously used traditional locking mechanisms, such as springs or solenoids, that may degrade over time and may be disturbed by outside forces.

An object of the present invention is therefore to provide a key storage device with higher durability.

SUMMARY

According to a first aspect of the invention, the above and other objects of the invention are achieved, in full or in part, by a key storage device as defined by claim 1. According to this aspect, the above object is achieved by a key storage device comprising a tubular housing having an open proximal end and a distal end.

A sliding carriage is insertable into the proximal end of the housing. The sliding carriage comprises a compartment for a key to be stored and is displaceable between an open position in which a majority of the sliding carriage is outside of the housing and the compartment is accessible for key retrieval, and a closed position in which the majority of the sliding carriage is inside the housing and the compartment is inaccessible.

A lock mechanism is arranged within the tubular housing. The lock mechanism has a locked state in which the sliding carriage is kept locked in its closed position and prevented from being displaced to its open position. The lock mechanism also has an unlocked state in which the sliding carriage may be displaced to its open position.

The lock mechanism comprises a piston and a catch member which are both movable between respective first positions in the locked state of the lock mechanism and respective second positions in the unlocked state of the lock mechanism.

An electric motor is coupled for causing movement of the piston of the lock mechanism. The control unit is adapted to cause the lock mechanism to switch from its unlocked state to its locked state by actuating the motor and thereby causing movement of the piston from its second position to its first position, wherein the movement of the piston in turn causes movement of the catch member from its second position to its first position.

Moreover, the control unit is adapted, based on an external input, to allow the lock mechanism to switch from its locked state to its unlocked state by actuating the motor and thereby causing movement of the piston from its first position to its second position, wherein the movement of the piston in turn allows movement of the catch member from its first position to its second position.

By using this innovative locking mechanism, a key storage device with higher durability is provided. The lock mechanism does not comprise any springs or magnets for biasing or pushing the piston and/or the catch member towards their respective first or second positions. Springs or magnets may degrade over time, and the catch member is a sturdier structure than for example a protruding deadbolt.

According to an embodiment, the piston is movable in an axial direction of the sliding carriage and comprises a slanted edge, wherein, when the piston is moved towards the first position thereof, it pushes the catch member towards the first position thereof into engagement with the sliding carriage, thereby keeping the sliding carriage locked in its closed position.

An advantage of this embodiment is that the slanted edge will catch the catch member even if it is slightly out of position, leading to a better margin for error. An alternative to the slanted edge may be a groove made to catch and hold the catch member in place or to connect the piston and catch member.

According to an embodiment, when the sliding carriage is moved from its closed position to its open position, it pushes the catch member towards the second position thereof.

An advantage of this embodiment is that it does not require any additional components or biasing. It also means that the catch member is only in the second position when it absolutely needs to be, which may speed up the locking or unlocking procedure.

According to an embodiment, the catch member is a ball or cylinder.

An advantage of this embodiment is that balls and cylinders may roll and has a small contact surface with its surrounding, which reduces friction.

According to an embodiment, the electric motor comprises a drive shaft being operatively connected to a screw which is engaged with a nut which is in contact with the piston, wherein the drive shaft rotates upon actuation of the motor and causes rotation of the screw which drives the nut to push the piston between its first and second positions.

An advantage of this embodiment is that this solution is easy to integrate with the rotating drive shaft. There are of course many equivalent components that the skilled person could replace the screw and nut with, for example cogs, which are to be interpreted as within the scope of the present invention. The dimensions and speed of the electric motor, the drive shaft, the screw, the nut and the lock mechanism all need to be balanced to achieve a fast locking and unlocking speed.

According to an embodiment, the catch member is movable in a direction transversal to the axial direction of the sliding carriage.

An advantage of this embodiment is that it has more margin for error between the locked and unlocked states, as the catch member may be in an optimal locking position even when the piston is not fully extended.

According to an embodiment, a distal end of the sliding carriage comprises a forked extension with at least two prongs, wherein at least a first of said at least two prongs comprises a hooked portion for engagement with the catch member of the locking mechanism.

An advantage of this embodiment is that the hooked portion allows for a more stable engagement with the catch member, and the prongs give the structure more stability. An alternative to distinct prongs may be a hollow cylinder extending from the distal end of the sliding carriage with a radial cross-section similar to the two-pronged embodiment with one hook shown in the figures.

According to an embodiment, at least a second of said at least two prongs acts as a counterstay for the engagement of the hooked portion.

An advantage of this embodiment is that a counterstay increases the structural integrity of the distal end of the sliding carriage, which is beneficial to the security of the key storage device. An alternative would be for the tubular housing to comprise a counterstay, however a benefit of arranging the counterstay in the sliding carriage is that it may function independently of the width of the tubular housing. The sliding carriage and specifically the distal end thereof is preferably made from a sturdy, resilient material.

According to an embodiment, a second housing is provided outside of the tubular housing at the distal end thereof, the second housing containing the control unit.

An advantage of this embodiment is that the second housing may be accessible to unauthorized people, which makes it easier to allow maintenance of some of the electronic components and allows for more stable wireless transmission.

According to an embodiment, the second housing further contains one or more batteries for supplying power to the control unit and the electric motor.

An advantage of this embodiment is that batteries allow for the device to be placed without concern for wired power availability. By placing the batteries in the second housing, they may be replaced without having to unlock the tubular housing. An alternative to a conventional battery may be an accumulator which stores solar power.

According to an embodiment, the second housing comprises a button for enabling the control unit to cause actuation of the motor. An advantage of this embodiment is that it saves on energy consumption and forces a user to be in proximity to the storage device when locking/unlocking it, which increases security.

According to an embodiment, the second housing comprises at least one LED which provides visual feedback of the status of the key storage device.

An advantage of this embodiment is that it improves the user experience of using the key storage device and provides comfort for a user that is worried that the key is not properly locked away. Examples of at least one LED producing different, distinct signals are one light flickering in specific sequences or three lights: red, green and blue; that can be combined to any desired color according to technology known in the art. Examples of different kinds of feedback tied to a specific distinct signal are: Notifying that the device is ready to receive input, notifying that the battery needs to be replaced, notifying that a wireless connection has been established, notifying that the lock mechanism is in a locked or unlocked state, and alerting that something has gone wrong.

According to an embodiment, the second housing further contains a wireless communication unit for receiving external input to the control unit.

An advantage of this embodiment is that it allows wireless authentication of a user, which is very convenient when smartphones are common. By placing the wireless communication unit in the second housing, it is not shielded by the more durable material that the tubular housing is made of. Examples of wireless communication are: Bluetooth, Bluetooth Low Energy (BLE), near-field communication (NFC), radio frequency identification (RFID), LTE and Wi-Fi; but other wireless communications are of course also possible within the scope of the present invention.

According to an embodiment, the electric motor is a step motor.

An advantage of this embodiment is that it is easy to calibrate and control.

According to an embodiment, the electric motor is a DC motor.

An advantage of this embodiment is that it is flexible.

According to an embodiment, the tubular housing is made of sturdy metal and is designed to protect the key safely in the compartment while withstanding attempts to steal the key by using external force.

An advantage of this embodiment is that it keeps the key safe and by only requiring the tubular housing to be made of sturdy metal, weight and costs are minimized. Examples of sturdy metals are: aluminium, steel and titanium; but other sturdy metals are of course also possible within the scope of the present invention. The tubular housing is preferably also safe to use in outside weather conditions.

According to an embodiment, the distal end of the tubular housing further comprises a lock unit which comprises the lock mechanism, the electric motor and a first sensor that measures the position of the piston.

An advantage of this embodiment is that the lock unit simplifies assembly of the storage device and that the sensor may be used to monitor the wear of the locking mechanism and allow for continuous calibration, thereby ensuring a durable performance. The sensor may also be used to monitor if the piston is in a locked or unlocked position. Another advantage is that by placing the locking mechanism at the distal end of the tubular housing, it is as far away as possible from the vulnerable open proximal end of the tubular housing. Examples of sensors include optical sensors and capacitive sensors According to an embodiment, the lock unit further comprises a second sensor that measures the position of the sliding carriage.

An advantage of this embodiment is that the sensor may be used to monitor the wear of the locking mechanism and allow for continuous calibration, thereby ensuring a durable performance. The sensor may also be used to monitor if the electric motor is working at its intended load to make sure there is no external interference. Examples of sensors include optical sensors and capacitive sensors.

According to an embodiment, the control unit is adapted to prevent movement of the lock mechanism by not actuating the electric motor unless the second sensor indicates that the sliding carriage is in a closed position.

An advantage of this embodiment is that it prevents the lock mechanism to be moved when its components are misaligned, leading to less wear and thereby a more durable lock mechanism.

According to an embodiment, a proximal end of the sliding carriage comprises a rotational handle which rotates a locking tongue into, and out of, engagement with a slit in the tubular housing.

An advantage of this embodiment is that it forces the sliding carriage to be inserted fully and it gives the user a tactile feel of locking. Alternatives to a rotational handle are: a lever or a button which drives a gear unit to rotate the locking tongue.

According to an embodiment, the electric motor is controlled by the control unit using coded communication.

An advantage of this embodiment is that it prevents unauthorized manipulation of the electric motor. One example of coded communication is encrypted communication.

According to an embodiment, the coded communication involves transmission of encrypted data over a serial communication interface.

An advantage of this embodiment is that it is secure, loss-less, fast and simple.

According to an embodiment, the lock mechanism is in the unlocked state if the piston is within 5-15% of a maximum distance from the electric motor and is in the locked state if the piston is within 85-95% of the maximum distance from the motor.

An advantage of this embodiment is that this allows for the lock mechanism to never have to operate at extreme values, thereby leaving a margin for error and increasing the durability of the lock mechanism.

Other objectives, features and advantages of the present invention will appear from the following detailed disclosure, from the attached claims, as well as from the drawings. It is noted that the invention relates to all possible combinations of features.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

By way of example, embodiments of the present invention will now be described with reference to the accompanying drawings, in which.

DETAILED DESCRIPTION

Figure 1:
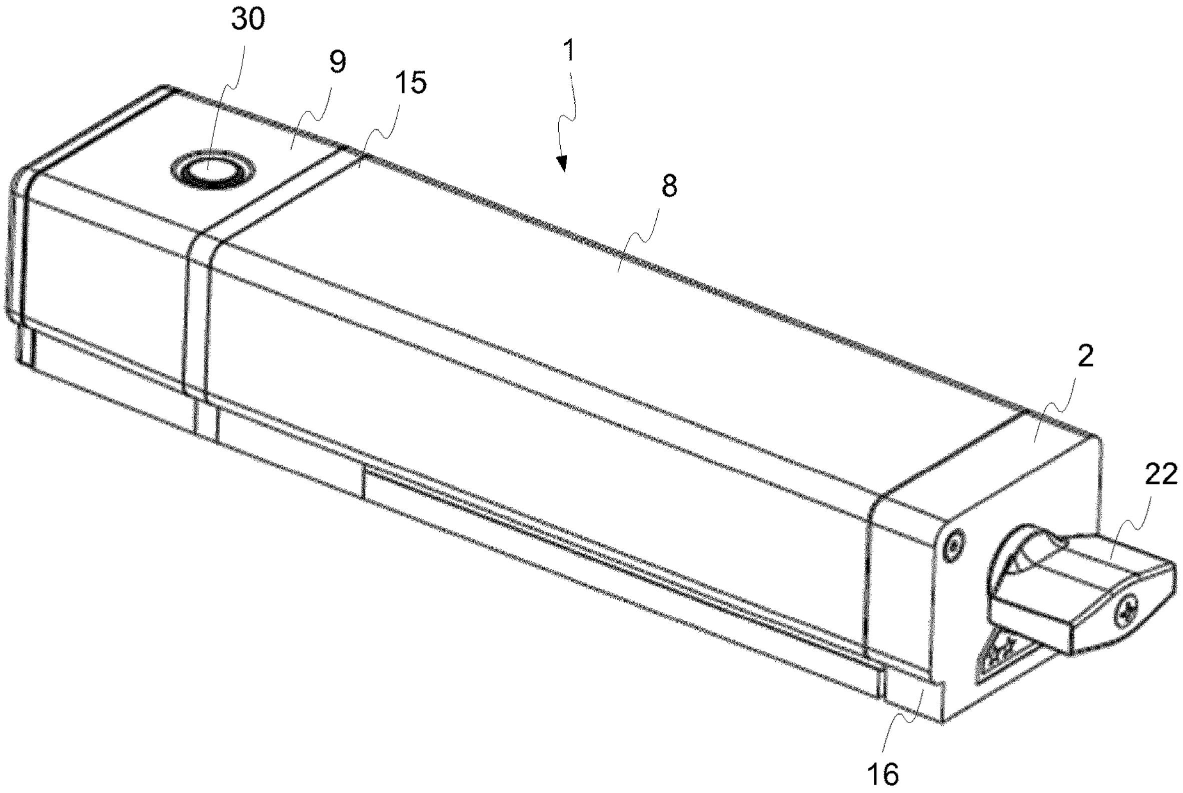
FIG. 1 shows an isometric view of a key storage device according to the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
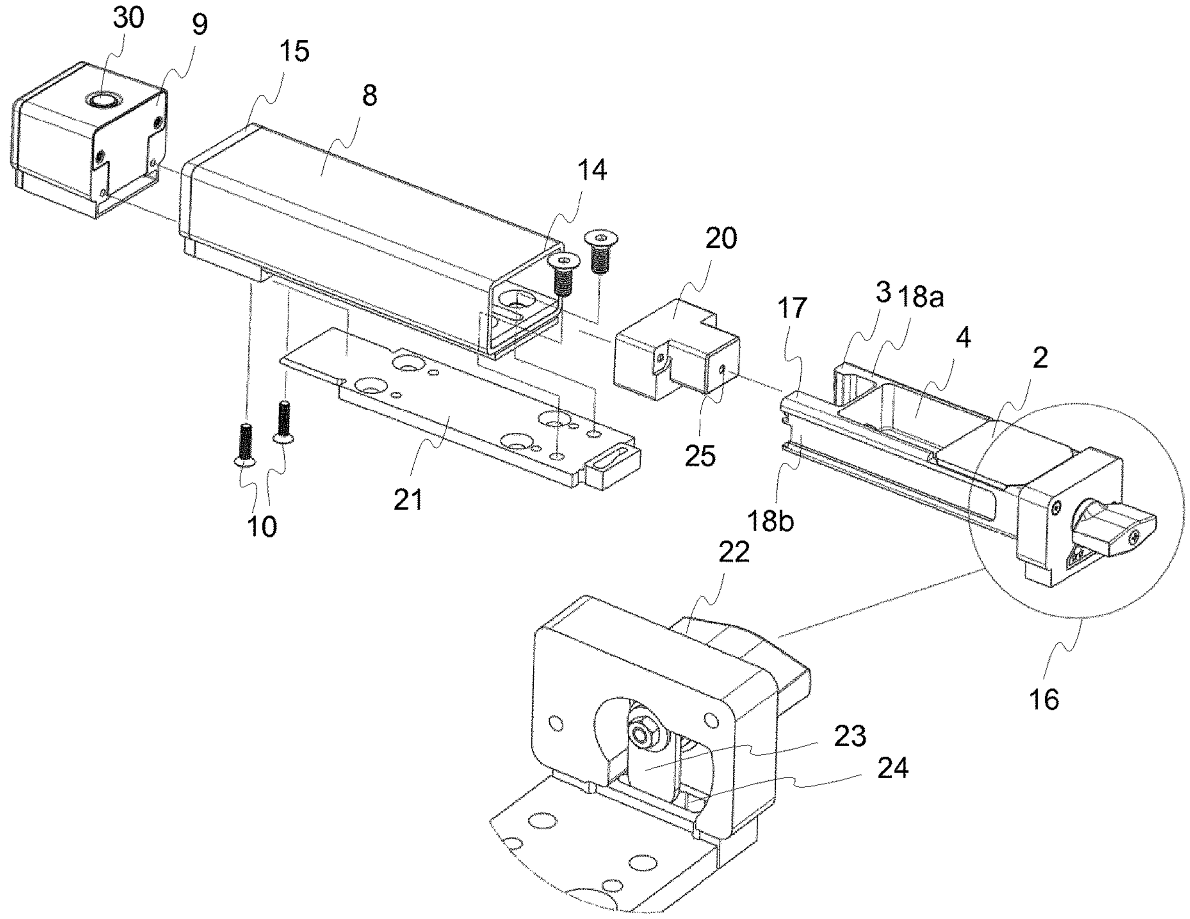
FIG. 2 shows an exploded isometric view of the same key storage device.
Figure 6:
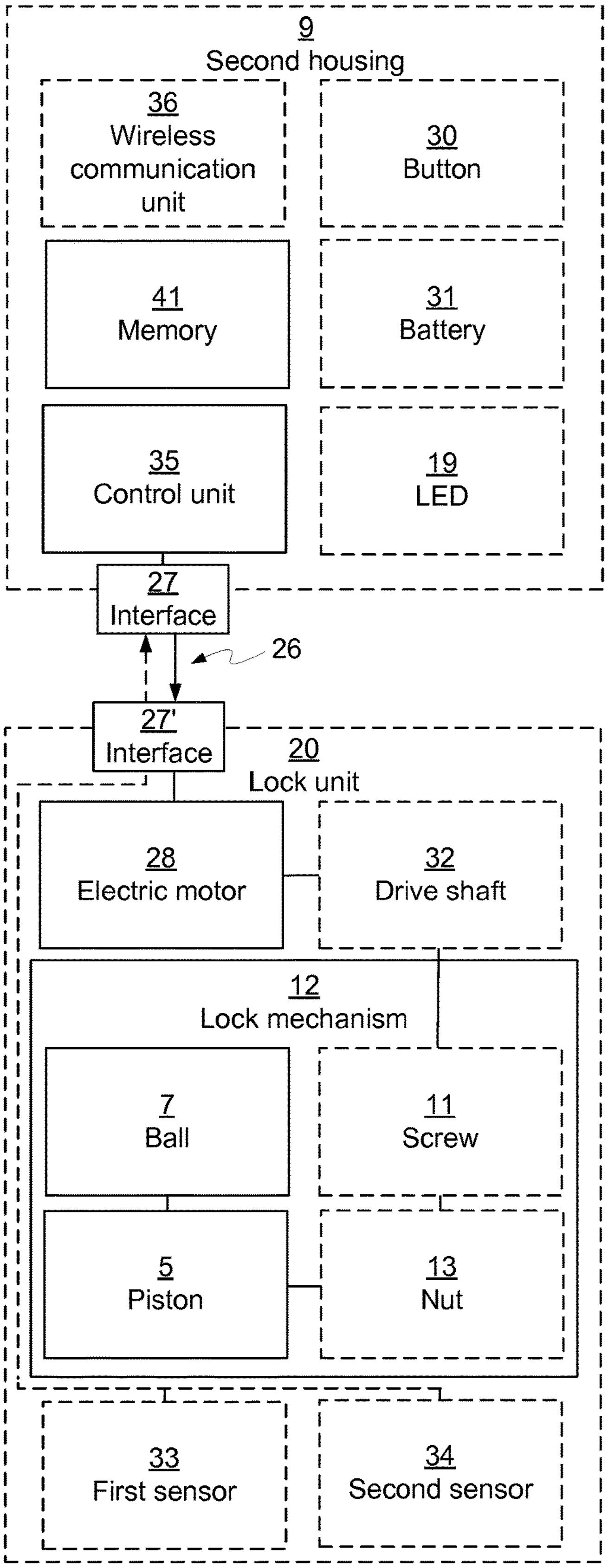
FIG. 6 shows an arrangement of some main components of the key storage device.

FIGS. 1 and 2 show a key storage device 1 according to one embodiment of the invention. It comprises a tubular housing 8 made of steel which protects a key stored inside of a compartment 4 of a sliding carriage 2. A knob 22 is placed at a proximal end 16 of the sliding carriage 2, which rotates a locking tongue 23 into a slit 24 in the sliding carriage 2 which ensures that the sliding carriage 2 is positioned correctly in the tubular housing 8. A second housing 9 is at a distal end 15 of the tubular housing 8, which contains a control unit 35 (FIG. 6) which controls an electric step motor 28 (FIG. 6). Examples of a control unit 35 include a processing unit in the form of, for instance, one or more CPUs and/or DSPs, being programmed to perform its functionality by executing program instructions of a computer program. Alternatively, the control unit 35 may be implemented as an FPGA, ASIC, etc. The second housing also contains a memory 41 (FIG. 6) for the control unit 35, where the memory may be implemented using any commonly known technology for computer-readable memories such as ROM, RAM, SRAM, DRAM, CMOS, FLASH, DDR, EEPROM memory, flash memory, hard drive, optical storage or any combinations thereof. The second housing also contains a wireless communications unit 36 (FIG. 6) for transmitting and receiving for example authorizations to unlock the key storage device 1 or notifications about the activity of the device 1.

The second housing 9 further comprise a button 30 which activates the power source for the control unit 35 (FIG. 6), in this case a battery 31 (FIG. 6). The button 30 is transparent and fitted with light emitting diodes (LEDs) 19 (FIG. 6) that gives a user feedback. Examples of feedback include: if the power source is active, if a user authorization is successful, if the lock mechanism is in a locked or unlocked state, and if something has gone wrong.

Figure 3A:
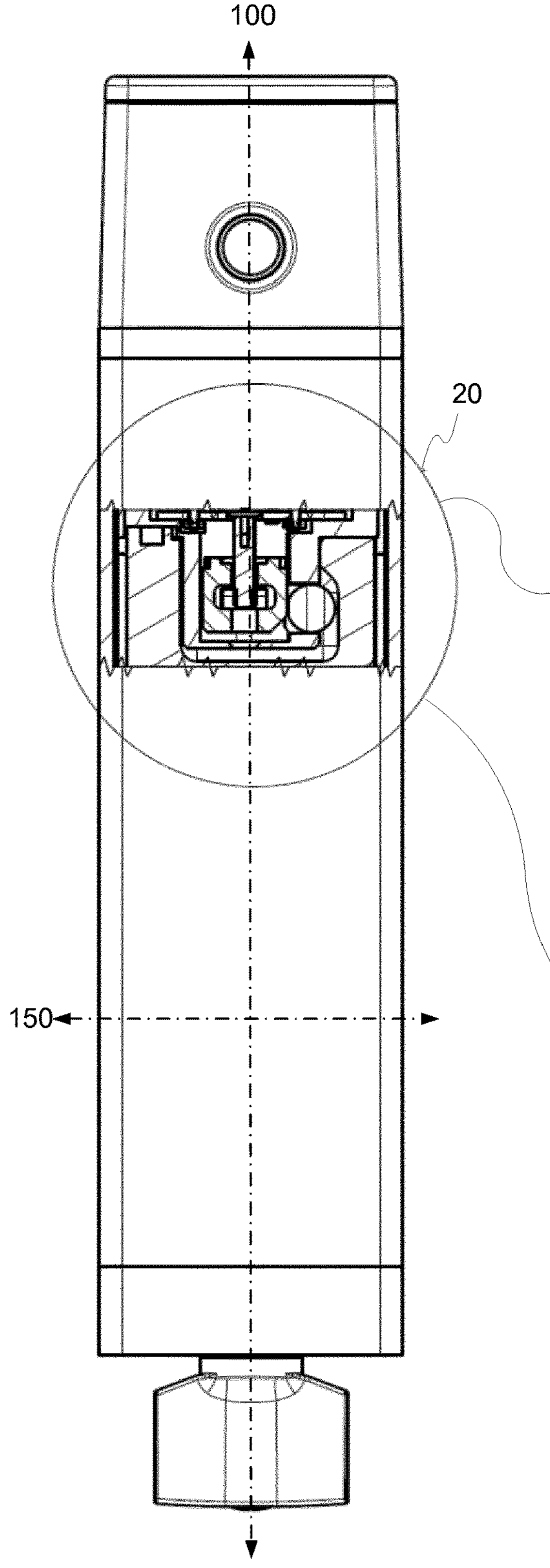
FIG. 3*a* shows a front view of the key storage device with an exposed sectional view of the lock mechanism.
Figure 3B:
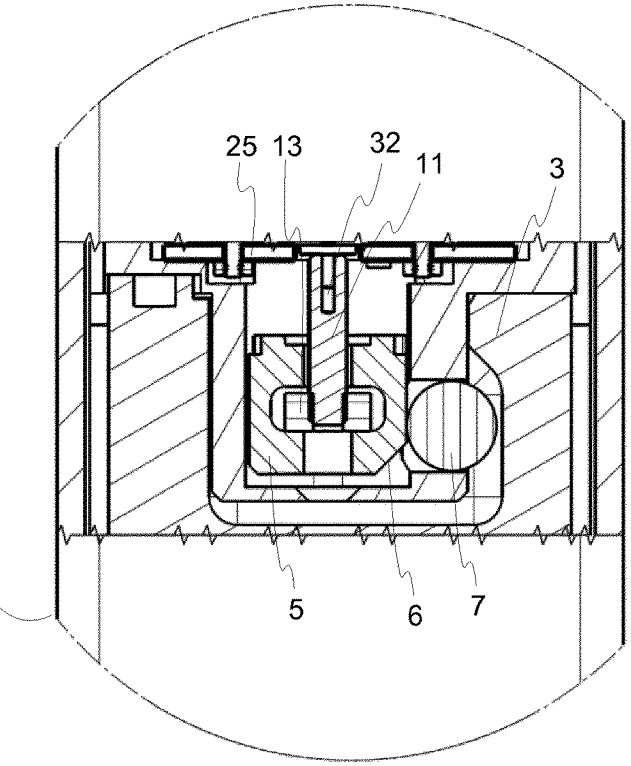
FIG. 3*b* shows the lock mechanism in a locked state.
Figure 3C:
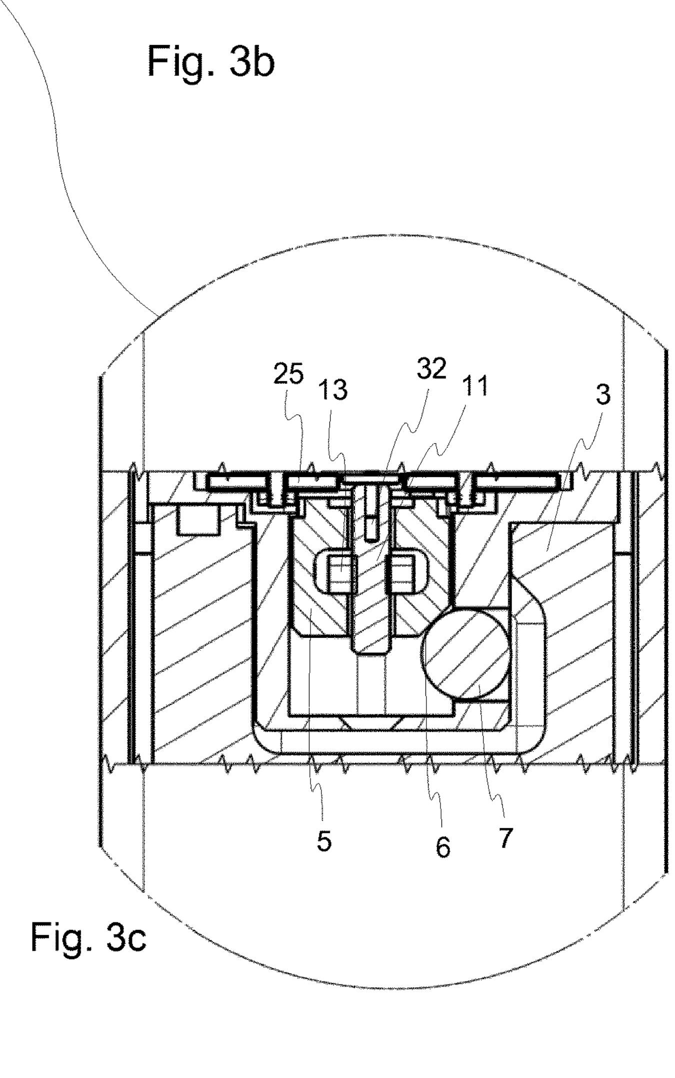
FIG. 3*c* shows the lock mechanism in an unlocked state.

FIG. 2 shows an exploded view of the key storage device 1. The locking tongue 23 and the slit 24 mentioned above are shown. The compartment 4 for the key to be stored is shown, it is large enough to hold one or more keys. At the distal end 17 of the sliding carriage 2, a forked extension comprises two prongs 18*a*, 18*b*, wherein a first of the prongs 18*a* comprise a hooked portion 3 for engagement with a catch member 7 (FIGS. 3*a-c*). A second of the prongs 18*b* acts as a counterstay for the engagement of the hooked portion. For this engagement and counterstay to be effective, the two prongs 18*a*, 18*b* are preferably made from a sturdy and resilient material. All of the sliding carriage 2 except perhaps the proximal end 16 beyond the compartment 4 is preferably made from a sturdy material to prevent unauthorized access to the compartment 4.

A lock unit 20 is arranged at the distal end 15 of the tubular housing 8 and attached by screws 10. The lock unit 20 could be arranged at any position in the tubular housing 8, however by arranging it far away from the open proximal end 14 of the tubular housing 8, security is increased. The lock unit 20 may be attached by many different fastening means equivalent to screws 10 known to the skilled person, such as nails, adhesives and plugs. The lock unit 20 comprises the electric motor 28 and a lock mechanism 12 which comprises a piston 5 and a catch member 7 in the form of a ball.

The lock unit 20 may also comprise a circuit board 25, which may comprise the electric motor 28; a first sensor 33 for measuring the position of the piston 5 to determine if the key storage device 1 is locked; and a second sensor 34 for measuring the position of the sliding carriage 2 to determine whether the sliding carriage 2 is in an open or closed position.

A mounting support 21 made from aluminum or steel is fastened using screws to the tubular housing 8. The mounting support 21 is used to securely fasten the key storage device 1 to a secure surface, such as a wall or door. The mounting support 21 may also be shaped to extend around the hinge side of a door and be fastened on the inside of the door. This has an advantage that the fastening means are protected on the inside of the door when the door is closed. Other mounting examples include mounting the tubular housing within a wall with the sliding carriage 2 and the second housing 9 extending beyond the wall, so that they remain accessible.

FIG. 3*a-c* show the lock mechanism 12 in a locked (FIG. 3*b*) and an unlocked (FIG. 3*c*) state, respectively. In this embodiment, the circuit board 25 comprises an optical sensor 33 for measuring the position of the piston 5 and a limit switch 34 for measuring the position of the sliding carriage 2. When the electric motor 28 is activated, it rotates a drive shaft 32. A screw 11 is arranged on the drive shaft 32 which is rotated along with the drive shaft 32, which is turn rotates a nut 13 which is arranged on the screw 11. As the nut 13 rotates, it moves up or down depending on the direction of rotation, thus pushing on the piston 5 and moving it between its first (FIG. 3*b*) and second (FIG. 3*c*) positions. The piston 5 is not at its maximum distance from the electric motor 28 in the first position shown (FIG. 3*b*), however this is still a locked first position as the ball 7 is prevented from moving further into the lock unit 20. The ball 7 is pushed between its first (FIG. 3*b*) and second (FIG. 3*c*) positions by the piston 5, primarily using its slanted edge 6. The ball 7 is made from stainless steel and preferably moves with little friction between its first and second positions.

In the first position of the ball 7 (FIG. 3*b*) it engages with the hooked portion 3 of the sliding carriage 2, preventing the sliding carriage 2 from being displaceable within the tubular housing 8. The ball 7 abuts the side of the piston 5 to ensure that a portion of the ball 7 protrudes far enough from the lock unit 20 to sufficiently engage the hooked portion 3 of the sliding carriage 2. The dimensions of the ball 7, the lock unit 20 and the hooked portion 3 need to be carefully managed to achieve a sufficient engagement between the ball 7 and the hooked portion 3 while still allowing unobstructed movement of the piston 7 and the sliding carriage 2. The dimensions and speed of the electric motor 28, the drive shaft 32, the screw 11, the nut 13 and the lock mechanism 12 all need to be balanced to achieve a fast locking and unlocking speed.

In the second position of the ball 7 (FIG. 3*c*) it no longer abuts the side of the piston 5 and may move further into the lock unit 20 until it is stopped by the slanted edge 6. In this position, the ball 7 no longer prevents the sliding carriage 2 from being displaced and the key storage device 1 is unlocked. If the ball 7 does not move further into the lock unit 20 automatically, it may be pushed by the hooked portion 3 of the sliding carriage.

Figure 4A:
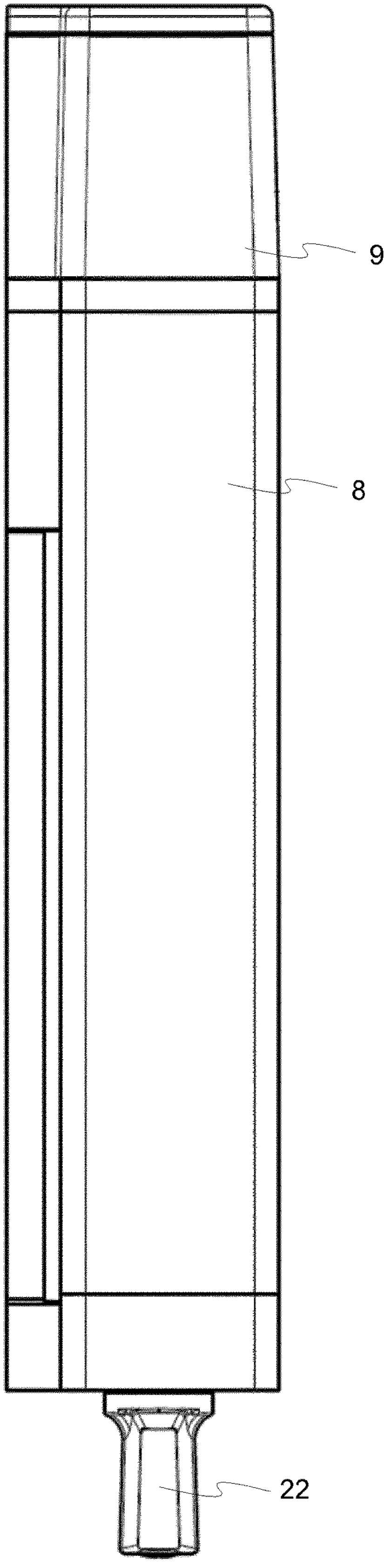
FIG. 4*a* shows a side view of the key storage device.
Figure 4B:
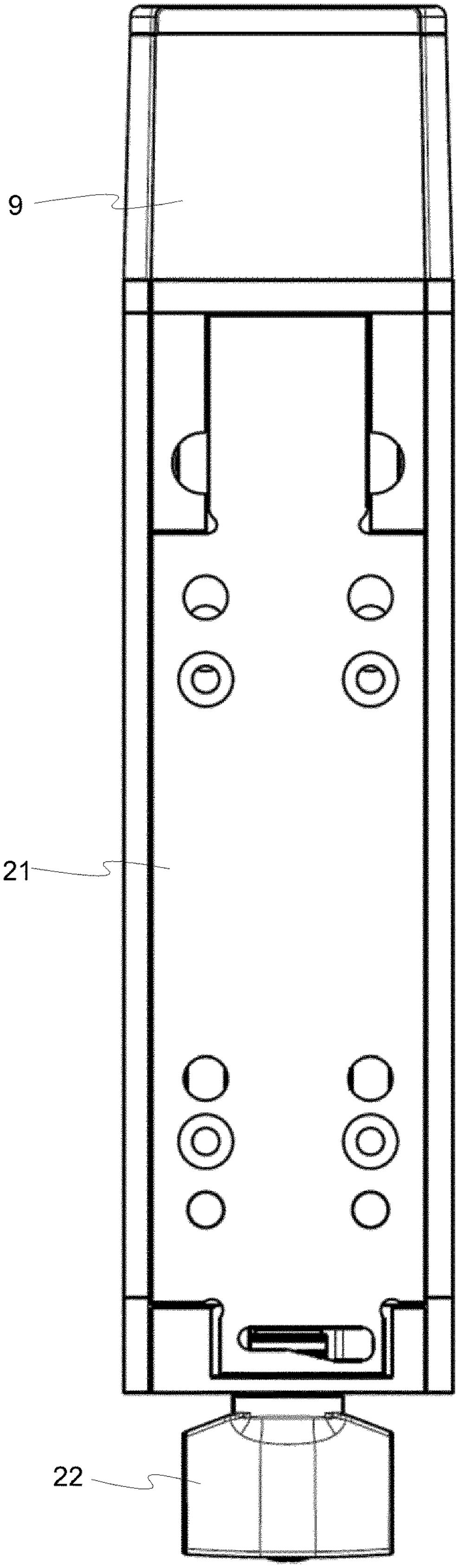
FIG. 4*b* shows a rear view of the key storage device.

FIG. 4*a-b* show the key storage device 1 in different perspective views. The tubular housing 8 is made of the same sturdy metal at all of its sides to prevent any one side from being a security risk. The front side of the tubular housing 8 may also comprise a support structure to further reinforce the metal. The mounting support 21 also needs to be made from a sturdy metal and securely fastened both to the tubular housing 8 and the secure surface it is fastened to, to prevent someone from stealing the entire key storage device and breaking it open later with heavy machinery. The key storage device 1 is preferably safe to use outdoors, meaning that the housings 8, 9 need to be water proof and the electronics and moving parts need to withstand high and low temperatures.

Figure 5A:
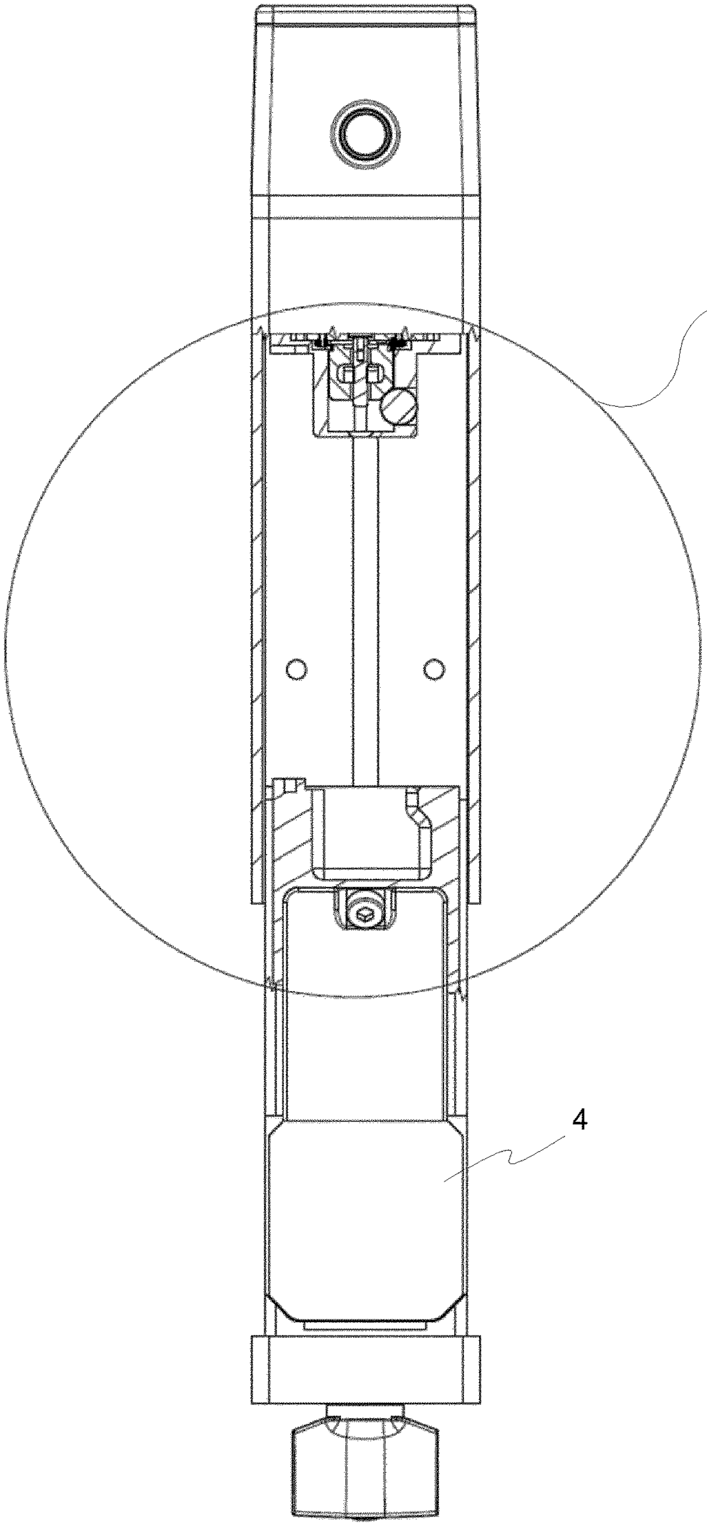
FIG. 5*a* shows a front view of the key storage device with the sliding carriage in an open position with the compartment accessible.
Figure 5B:
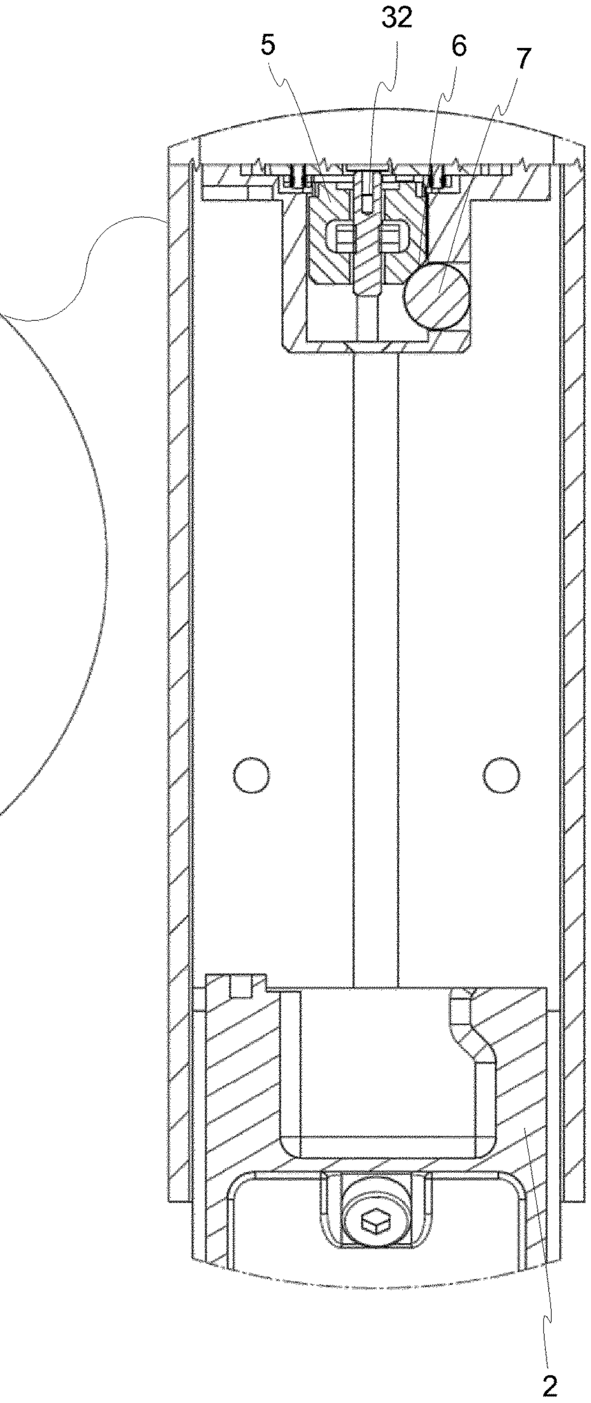
FIG. 5*b* shows the lock mechanism in an unlocked position and the sliding carriage in an open position.

FIG. 5*a-b* show the key storage device when the sliding carriage 2 is in an open position with the compartment 4 accessible. FIG. 5*a* shows the compartment 4 accessible for key storage and retrieval. FIG. 5*b* shows the lock mechanism 12 when the sliding carriage 2 has been displaced. To prevent the ball 7 from moving out of the lock unit 20, specific dimensions of the lock unit 20, the tubular housing 8 and the ball 7 may be used.

FIG. 6 shows a schematic view of the various groupings of possible components according to the present invention. The lock unit 20 may preferably be arranged within the tubular housing 8, for security reasons. The second housing 9 may preferably be arranged outside of the tubular housing 8. An advantage of this is that it allows for components that are not sensitive to unauthorized access for security reasons to be arranged in a housing that simplifies replacement of broken or worn out components, such as the battery 31. This also allows the wireless communication unit 36 to not be shielded by the sturdy metal of the tubular housing 8, which increases performance.

However, the control unit 35 still needs to be able to communicate control signals 26 with the electric motor 28, which needs to be in the tubular housing 8 for security reasons. There is therefore a communication interface 27, 27' between the control unit 35 and the electric motor 28. Examples of possible communication interfaces 27, 27' are wireless transmitters/receivers and wires. The communication 26 will also need to be coded, to prevent unauthorized control of the electric motor 28. Examples of coding are encryption. In case the electric motor 28 is a step motor and the communication interface 27, 27' is a serial wire connection, the step motor 28 may be adapted to only accept communication 26 with a specific pulse frequency and pulse length and only on specific wires.

Once the electric motor 28 has received and accepted the communicated control signals 26 from the control unit 35, it may rotate the drive shaft 32 which rotates the screw 11, which rotates the nut 13, which pushes the piston 5, which ultimately pushes the ball 7 between the first and second positions. The communication interface 27, 27' may also optionally be adapted to receive information from the sensors 33, 34 for measuring the position of the piston 5 and the sliding carriage 2, respectively, and transmit 26 this information to the control unit 35. The control unit 35 may then use this information to give slight adjustments to the electric motor 28 or prevent it from moving.

Figure 7:
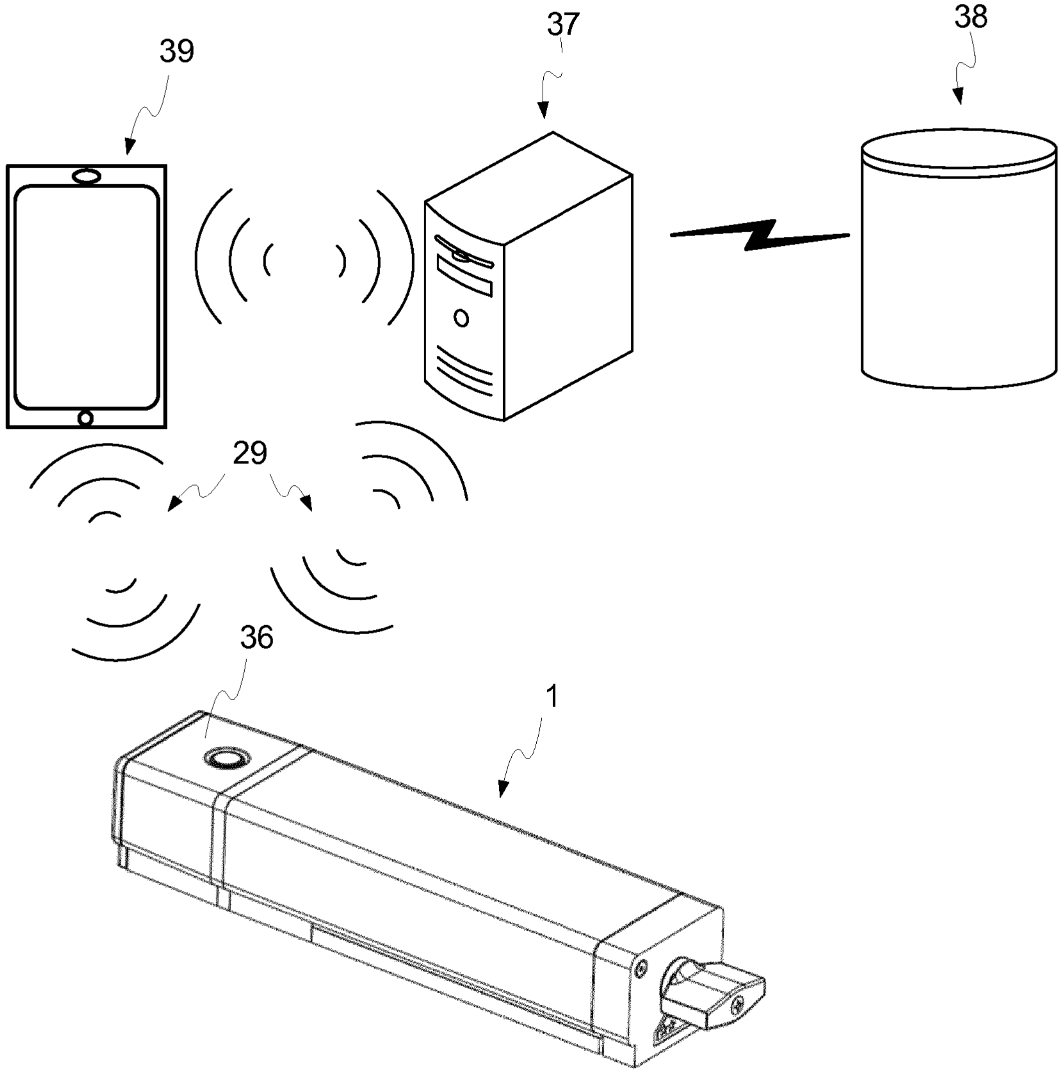
FIG. 7 shows an exemplifying environment in which the present invention may be exercised.

FIG. 7 shows an exemplifying environment in which the present invention may be exercised. Many different use cases are possible in the shown environment and many other with different environments are also possible. One example is that the wireless communication unit 36 of the key storage device 1 may be adapted to receive 29 authorization information from a portable communication device 39, such as a mobile phone or key fob, which is transmitted to the control unit 35, which unlocks the key storage device 1. A user may need to press the button 30 before the wireless communication unit 36 will be able to accept authorization information. The authorization information may be stored locally on the portable communication device 39 and may be selectable from a list of several different authorization information sets for different key storage devices 1. The portable communication device 39 may also receive the authorization information from a server 37, which retrieves the information from a secure database 38. The portable communication device 39 may need to present authorization such as a user name and password to access the authorization information for the key storage device. The communication unit 36 of the key storage device 1 may also transmit 29 information to the portable communication device 39, such as notifications that a locking or unlocking procedure has succeeded or failed. The communication unit 36 of the key storage device 1 may also transmit 29 information to the server 37, such as status updates and security alerts. The server 37 may relay this information to several different portable communication devices 39 and it may store the information in the secure database 38. The authorization information may be an encryption key that is generated at the first installation of the key storage device 1 and stored in the secure database 38 via communication with the server 37 and optionally the portable communication device 39.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A key storage device comprising:

a tubular housing having an open proximal end and a distal end;

a sliding carriage insertable into the proximal end of the housing, the sliding carriage comprising a compartment for a key to be stored, the sliding carriage being displaceable between an open position, in which a majority of the sliding carriage is outside of the housing and the compartment is accessible for key retrieval, and a closed position, in which the majority of the sliding carriage is inside the housing and the compartment is inaccessible;

a control unit;

a lock mechanism arranged within the tubular housing, the lock mechanism having a locked state, in which the sliding carriage is kept locked in its closed position and prevented from being displaced to its open position, and the lock mechanism having an unlocked state, in which the sliding carriage may be displaced to its open position, said lock mechanism comprising an electric motor-actuated piston member and a catch member which are both movable between respective first positions in the locked state of the lock mechanism and respective second positions in the unlocked state of the lock mechanism; and an electric motor coupled for causing movement of the piston member of the lock mechanism, wherein the electric motor comprises a drive shaft being operatively connected to a screw which is engaged with a nut which is in contact with the piston member, wherein the drive shaft rotates upon actuation of the motor and causes rotation of the screw which drives the nut to push the piston member between its first and second positions;

wherein the control unit is adapted to cause the lock mechanism to switch from its unlocked state to its locked state by actuating the motor and thereby causing movement of the piston member from its second position to its first position, the movement of the piston member in turn causing movement of the catch member from its second position to its first position; and wherein the control unit is adapted, based on an external input, to cause the lock mechanism to switch from its locked state to its unlocked state by actuating the motor and thereby causing movement of the piston member from its first position to its second position, the movement of the piston member in turn enabling movement of the catch member from its first position to its second position.

2. The key storage device according to claim 1, the piston member being movable in an axial direction of the sliding carriage and comprising a slanted edge, wherein when the piston member is moved towards the its first position, it pushes the catch member towards its first position into engagement with the sliding carriage, thereby keeping the sliding carriage locked in its closed position.

3. The key storage device according to claim 1, wherein when the sliding carriage is moved from its closed position to its open position, it pushes the catch member towards its second position.

4. The key storage device according to claim 1, wherein the catch member is a ball or cylinder.

5. The key storage device according to claim 1, wherein the catch member is movable in a direction transverse to the axial direction of the sliding carriage.

6. The key storage device according to claim 1, wherein a distal end of the sliding carriage comprises a forked extension with at least two prongs, wherein at least a first of said at least two prongs comprises a hooked portion for engagement with the catch member of the locking mechanism.

7. The key storage device according to claim 6, wherein at least a second of said at least two prongs acts as a counterstay for the engagement of the hooked portion.

8. The key storage device according to claim 1, further comprising a second housing outside of the tubular housing at the distal end thereof, the second housing containing the control unit.

9. The key storage device according to claim 8, wherein the second housing further contains one or more batteries for supplying power to the control unit and the electric motor.

10. The key storage device according to claim 8, wherein the second housing comprises a button for enabling the control unit to cause actuation of the motor.

11. The key storage device according to claim 8, wherein the second housing comprises at least one LED which provides visual feedback of a status of the key storage device.

12. The key storage device according to claim 8, wherein the second housing further contains a wireless communication unit for receiving external input to the control unit.

13. The key storage device according to claim 1, wherein the electric motor is a step motor.

14. The key storage device according to claim 1, wherein the electric motor is a DC motor.

15. The key storage device according to claim 1, wherein the tubular housing is made of metal and is designed to protect the key in the compartment while withstanding attempts to steal the key by using external force.

16. The key storage device according to claim 1, wherein the distal end of the tubular housing further comprises a lock unit which comprises the lock mechanism, the electric motor and a first sensor that measures a position of the piston member.

17. The key storage device according to claim 16, wherein the lock unit further comprises a second sensor that measures a position of the sliding carriage.

18. The key storage device according to claim 17, wherein the control unit is adapted to prevent switching of the lock mechanism by not actuating the electric motor unless the second sensor indicates that the sliding carriage is in its closed position.

19. The key storage device according to claim 1, wherein a proximal end of the sliding carriage comprises a rotational handle which rotates a locking tongue into, and out of, engagement with a slit in the tubular housing.

20. The key storage device according to claim 1, wherein the electric motor is controlled by the control unit using coded communication.

21. The key storage device according to claim 20, wherein the coded communication involves transmission of encrypted data over a serial communication interface.

22. The key storage device according to claim 1, wherein the lock mechanism is in the unlocked state when the piston member is within 5-15% of a maximum distance from the electric motor and is in the locked state when the piston member is within 85-95% of the maximum distance from the motor.

* * * * *